US008372275B2

(12) United States Patent
Lackey et al.

(10) Patent No.: US 8,372,275 B2
(45) Date of Patent: Feb. 12, 2013

(54) SINK-SIDE FILTER

(75) Inventors: Robert Lackey, Hickory, NC (US); Bob Beckmann, Vale, NC (US); Glenn Cueman, Denver, NC (US)

(73) Assignee: Protect Plus, LLC, Hickory, NC (US)

( * ) Notice: Subject to any disclaimer, the term of this patent is extended or adjusted under 35 U.S.C. 154(b) by 446 days.

(21) Appl. No.: 12/728,933

(22) Filed: Mar. 22, 2010

(65) Prior Publication Data
US 2011/0226679 A1  Sep. 22, 2011

(51) Int. Cl.
B01D 35/04 (2006.01)
B65D 5/74 (2006.01)
B67D 7/76 (2010.01)

(52) U.S. Cl. .......... 210/94; 137/801; 210/418; 210/435; 210/449; 210/460; 222/189.06; 222/566; 222/567

(58) Field of Classification Search .................... 210/85, 210/87, 91, 94, 100, 101, 138, 435, 449, 210/460, 418, 424; 222/189.06, 189.11, 222/566, 567; 137/801
See application file for complete search history.

(56) References Cited

U.S. PATENT DOCUMENTS

| 1,375,099 | A | * | 4/1921 | Lindemann | 200/61.86 |
| 4,885,081 | A | * | 12/1989 | Oliver | 210/87 |
| 5,133,385 | A | * | 7/1992 | Kawakami | 137/625.43 |
| 5,151,179 | A | * | 9/1992 | Bach et al. | 210/250 |
| 5,911,240 | A | * | 6/1999 | Kolar et al. | 137/624.11 |
| 5,976,362 | A | * | 11/1999 | Wadsworth et al. | 210/87 |
| 7,326,334 | B2 | * | 2/2008 | Boyd et al. | 210/87 |
| 7,810,650 | B2 | * | 10/2010 | Ennis et al. | 210/449 |
| 2003/0116495 | A1 | * | 6/2003 | Chau | 210/264 |
| 2004/0069695 | A1 | * | 4/2004 | Isobe et al. | 210/91 |
| 2005/0098485 | A1 | * | 5/2005 | Boyd et al. | 210/87 |
| 2006/0207920 | A1 | * | 9/2006 | Lackey et al. | 210/87 |
| 2007/0023332 | A1 | * | 2/2007 | Fan | 210/85 |
| 2007/0151919 | A1 | * | 7/2007 | Klump et al. | 210/418 |

* cited by examiner

Primary Examiner — Joseph Drodge
(74) Attorney, Agent, or Firm — Clements Bernard PLLC; Seth L. Hudson

(57) ABSTRACT

The present invention is a liquid filter that includes a removable filter cartridge that is easily accessible for quick, easy replacement, the filter being installed directly adjacent to or preferably in direct contact with the sink itself utilizing the opening originally intended for the spray attachment on the sink, or, where there is no opening for a spray attachment, by adding a small hole to access the liquid supply below the countertop, the filter being designed to sit entirely on top of the sink flange or countertop immediately adjacent to the sink and containing an integral faucet for dispensing filtered liquid, along with an integral actuator or switch to control the flow of filtered liquid.

13 Claims, 4 Drawing Sheets

SINK-SIDE FILTER

FIELD OF THE INVENTION

The present invention is generally directed to a liquid filtration device typically used in residential applications or in any application where a filtered liquid is desired and a sink with a faucet is available. The invention is more specifically directed to a water filtration device. The invention is designed to be mounted directly to the sink in order to provide filtered water on demand, yet will not interfere with the daily operation and use of the sink. The invention may be used in residential homes, or it may be mounted on sinks in a commercial or industrial setting. Due to the versatility of the invention, it can be used anywhere a sink is present and clean, filtered water is desired.

BACKGROUND OF THE INVENTION

Water is a basic necessity to sustain all life. Every living thing on the planet, animal and plant, needs water to survive. As such, the need for clean, pure water will never decrease. In fact, as populations grow, the need for clean, pure water will only increase. Recently, society has begun to focus more on the purity of water for both drinking and other applications. Pure water is bottled by a multitude of manufacturers and is sold in many places. Demand for pure bottled water is increasing and shows no signs of waning.

The medical community in the United States periodically issues statements that indicate the average person does not drink enough water. Unlike soda, milk, and other beverages, water is available to most people simply by turning on a faucet. Water is provided by the local utility companies who are generally responsible for ensuring that the water provided to homes and businesses is clean, pure, and free from harmful organisms. Indeed, many people rely solely on the public water systems to guarantee that the water flowing into their homes and businesses is fit for consumption. Typically, the municipal body responsible for providing water to the populace will have various treatment and purification procedures to help ensure the quality of the water provided to consumers. These systems can include large, industrial scale filters, treatment tanks, and other water processing devices. Unfortunately, sometimes these systems can break down, or these systems can miss a contaminant leaving the treated water with various forms of impurities.

Since water is such a vital part of people's everyday needs, the desire for clean, pure water continues to grow. Most municipal treatment facilities do an adequate job in cleaning and purifying water, however, there is concern that the municipal systems responsible for providing clean, pure water are simply overworked. Filtration of water on such a large scale can sometimes lead to water that contains particulate filtrate material left over from where the water was originally filtered. Moreover, some of the treatment methods and additive chemicals used in the cleaning and purifying of water can leave the water containing undesirable contaminants.

Municipal water treatment systems typically focus on removing various contaminants from water in order to provide clean, potable water for human consumption. Large scale purification of water is designed to reduce or eliminate the concentration of particulate matter including suspended particles, parasites, bacteria, algae, viruses, and fungi. Also, the municipal treatment facilities have apparatuses and methods to remove a wide range of dissolved and particulate material picked up by water from the surfaces the water may have made contact with after falling as rain and flowing to the treatment facility.

In the United States, the standards for drinking water quality are typically set by the government and have certain thresholds designed to ensure the drinking water is safe for consumption. In other countries around the world, however, the standards and thresholds for certain contaminants are not as stringent. Thus the warning of "don't drink the water," in various places around the world.

According to a 2007 World Health Organization report, 1.1 billion people lack access to an improved drinking water supply. The WHO estimates that 88% of the 4 billion annual cases of diarrheal disease are attributed to unsafe water and inadequate sanitation and hygiene. Further, 1.8 million people die from diarrheal diseases each year. The WHO further estimates that 94% of these diarrheal cases are preventable through modifications to the environment, including access to safe water. The WHO concludes that a few simple techniques for treating water at home, such as chlorination, filters, and solar disinfection, combined with storing it in safe containers could save a huge number of lives each year.

In most cases, it is not possible to tell whether water is of an appropriate quality by visual examination. If water has a cloudy appearance or there are visible particles present, then the water is most likely unsafe to drink. However, many dangerous contaminants are simply too small to be visible to the naked eye. It is impossible to know that the water is clean, pure, and fit to drink simply by looking at it. Thus, some simple procedures such as boiling or the use of a household activated carbon filter have been devised in an attempt to clean and purify water for drinking. Unfortunately, these simple steps are not sufficient for treating all the possible contaminants that may be present in water from an unknown source. Even natural spring water, which in the nineteenth century was considered safe for all practical purposes, must now be tested before determining what kind of treatment, if any, is needed. A chemical analysis of water, while expensive, is the only way to obtain the information necessary for deciding on the appropriate method of purification.

Thus, a need exists for a simple, easy to use filter that will ensure that water is clean, pure, and does not contain harmful contaminants. More specifically, a need exists for a filter capable of residential use or small commercial use that will allow persons to be assured that any contaminants left in water after the municipal treatment of the water are removed prior to drinking. More particularly, there are growing desires from home owners for a water filter for use in residences that will provide clean, purified water to the homeowner.

Currently, there are three principle types of water filtration systems commonly found in residential homes. These water filters are typically installed in the kitchen. These filters consist of undercounter systems, countertop systems, and faucet mount systems. Undercounter or undersink systems are located underneath the kitchen counter or kitchen sink and typically have a separate faucet from the main sink faucet. The separate faucet is mounted adjacent to the sink, allowing unrestricted access to the sink. However, this location interferes with the use of the counter and can block access to valuable counter space. Undercounter filters have good flow rates and filtration performance, but a person must undergo a difficult process to replace the filters. Often the difficult process of filter cartridge replacement requires special tools and will require the homeowner to turn off the water supply. In addition, undercounter filter systems typically require specialized cartridges which are expensive, and often only available at do-it-yourself or hardware retailers.

Unlike undercounter systems, countertop units are positioned on top of the countertop as close as possible to the sink. A countertop filter will require connection to the faucet to allow a diverter to be installed. A tube is run from the countertop filter to the diverter and must be long enough to allow the faucet to articulate and not pull the countertop filter into the sink. This attachment method can have tubes and or pipes running along the counter and can be very awkward and interfere with normal functions at the sink and faucet. Countertop filters are also often quite bulky and take up valuable counter space. Further, countertop filters can restrict access to the sink because they must be near the sink and have various plumbing attachments connecting the filter to the kitchen water supply.

Faucet mount systems which directly attach to the existing kitchen faucet seem to be the best alternative for the majority of homeowners. Faucet mount filters offer easy cartridge replacement without special tools, and provide high quality filtration performance and flow rate. Numerous faucet mount filters are available from several manufacturers and typically cost less than a countertop or undercounter filter. A faucet mount filter provides filtered water for drinking and cooking in a convenient location, right at the kitchen sink. Unfortunately, today's faucet mount filters have a significant drawback in that they block access to portions of the sink when in use. Moreover, a faucet mount filter is vulnerable to damage from interaction with pots and pans and other typical uses of the kitchen sink.

For example, U.S. Pat. No. 6,258,266 to Riback teaches a faucet mounted water filter. The filter mounts to the faucet on the sink and is able to provide filtered water by means of a switch. However, the filter taught in the '266 patent mounts directly to the faucet on the sink and can block access to valuable counter space or sink space. The housing that contains the filter cartridge protrudes significantly from the faucet and can interfere with the operation of the sink. Moreover, the filter can block the faucet from rotating to its full potential, thus limiting its usefulness and frustrating the user.

A further example of the current state of the art for water filters is U.S. Pat. No. 6,123,837 to Wadsworth et al. The '837 patent also teaches a water filter designed to attach to the faucet mounted on a sink. Like the '266 patent, the '837 patent teaches a filter that provides filtered water by means of a switch. The filter is attached to the sink via the faucet and is able to either filter the water as it flows into the filter or bypass the filter cartridge and flow directly to the faucet. Again, however, the filter taught by the '837 device suffers from the same problems as does the '266 device. Namely, it mounts to the faucet and can block access to the space on the counter or sink. Further, the filter has a large, protruding housing that holds the filter cartridge. This can block the rotation of the faucet preventing a user from the full use of the faucet. Thus, the '837 filter suffers many of the drawbacks of water filters currently available to the purchasing public.

Therefore, a need exists for a water filter that does not suffer from the disadvantages of water filters according to the prior art. Indeed, a water filter is needed that provides adequate flow rate and filtration properties. Moreover, a need exists for a water filter that does not interfere with a homeowner's use of the kitchen sink. Further, a need exists for a water filter that has an easily replaceable filter and does not require the use of special tools. Further, a need exists for a water filter that can take advantage of the current structure of most sinks for attachment, without necessitating extensive modifications to the sink structure. Still further a need exists for a water filter that does not suffer the limitations of having bulky or cumbersome diverters or handles. A need also exists for a water filter that can be selectively activated and deactivated. The present invention fulfills these long-felt needs.

BRIEF SUMMARY OF THE INVENTION

The present invention relates to water treatment devices, in particular, filters designed for use in private residences or small, commercial settings. Faucet mounted water filters, are becoming more widespread in use to treat water in a home or building before drinking, cooking, or other human consumption. Some of these devices include a filter for filtering particles and sediment from the water. In addition, at least some water filters include taste and odor filters for reducing chlorine or odor causing material from the water. In addition, some water filters include mercury and lead filters for removing mercury and lead from the water. Still further, some water filters include disinfection devices for removing, killing or inactivating microorganisms such as bacteria, viruses, cysts, protozoa, and the like from the water. The current invention provides a filter that can take advantage of all these advantages in a convenient location, free from the disadvantages prevalent in the prior art.

The present invention is in its most general form a liquid filtration device for the filtering of liquids. In its preferred embodiment, the present invention is designed to filter water in a home owner's kitchen. The present invention does not suffer from many of the disadvantages of the prior art such as including external handles or diverters that render the system bulky or cumbersome to operate. The present invention also includes a removable filter cartridge that is easily accessible for quick, easy replacement when the filter needs replacing. Further, the present invention can be moved between a filtering position and a non-filtering position to extend the life of the filter cartridge.

One of the main advantages of the present invention over those described and taught in the prior art is the location where the filter is mounted. The present invention is positioned and installed directly adjacent to or preferably in direct contact with the sink itself. In a preferred embodiment, the present invention is designed to utilize the opening originally intended for the spray attachment on the sink. In an alternative embodiment where there is no opening for a spray attachment, a small hole is drilled to allow connection to the water supply below the countertop. The present invention is designed to sit entirely on top of the sink flange or countertop immediately adjacent to the sink. The present invention has an integral faucet for dispensing water, along with an integral actuator or switch to control the flow of filtered water.

The present invention utilizes a carbon block in a cartridge housing of exactly the same type and size as used in popular faucet mount filtration systems available from DuPont and other manufacturers. Specifically, the present invention is designed to accommodate the FM 100 and FM 350 by DuPont. These particular cartridges use a carbon block based cartridge which provides for the removal of aesthetic contaminants such as chlorine, taste, odor, and sediment, as well as contaminants associated with negative health effects including heavy metals such as lead, mercury, and cadmium. In addition, these cartridges provide for the removal of organic contaminants including solvents, herbicides, pesticides and industrial pollutants. Moreover, these cartridges will also remove biological cysts from the water. In a preferred embodiment the present invention is designed to provide a flow rate of approximately 0.5 gallons per minute with normal household water pressure. The present invention in a preferred embodiment also is capable of providing up to 200 gallons of filtered water before the filter is in need of replacing.

The present invention is uniquely designed to allow the cartridge to be easily replaced. In a preferred embodiment, the filter cartridge is directly accessible from the top of the countertop and next to the sink. A user simply unscrews or unclips the filter cap and removes it from the filter housing. Then, the used filter cartridge is removed and a new filter cartridge is installed. The new cartridge simply drops in place, with no special tools required of any type, and no need to turn off the water supply to the unit. The actuator or switch prevents water from flowing into the filter while the filter cartridge is being changed.

A significant advantage to the new filter unit is its ability to use readily available cartridges. Applicant has designed the sink-side filter to utilize filter cartridges from Applicant's current line of replacement filter cartridges used in its faucet mounted product line. An advantage of this is that the retailer does not have to add additional inventory items to its product line, thus limiting the number of SKU's that the retailer must carry. A still further advantage of using existing filter cartridges is the interchangeability of filter cartridges between the existing faucet mounted filters and the new, sink-side filter. The sink mounted filter uses a cartridge that is the same as a faucet mount style filter cartridge. In addition the sink mounted filter can be designed and configured such that it can accommodate a wide range of faucet-mount style filter cartridges.

The present invention is designed so that the integral faucet is non-obtrusive and allows unrestricted access to the existing kitchen faucet and sink. There is no need to replace or even detach the existing faucet. The present invention simply provides another spigot in addition to the pre-existing faucet. This is also advantageous if a user desires to have dual sources of water running into the sink at the same time. For example, one may desire to have a source of hot water flowing into the sink at the same time one has a source of cold water flowing into the sink. With the second spigot provided by the present invention, one can have filtered water from the invention flowing into the sink at the same time one has hot water flowing from the sink faucet.

More specifically, the present invention is directed to a liquid filter. The liquid filter has a bottom housing with a liquid inlet that in a preferred embodiment is in the form of a pipe extending downwardly from the bottom housing. The liquid inlet passes through the sink and into the undercounter area. The filter also has any number of attachment means to affix it and secure it to the sink. The filter further contemplates having a central housing that is attached to the bottom housing, being fitted directly on top of the bottom housing. Also included is a switch that can be rotated to control an internal valve. The valve is constructed for the purpose of permitting and terminating liquid flow through the filter. This provides an easy way to turn the flow on or off. The filter also contemplates having a filter housing that encloses a removable filter cartridge. The filter cartridge is set within the filter housing and has a purification material contained within it. It is further contemplated that the replaceable filter cartridge is a standard cartridge available at most stores carrying filtration products. The filter is configured so the liquid inlet will direct liquid to and through the filter cartridge thereby filtering the liquid. The filter further has a spigot with a fluid output end mounted to the central housing of the filter. The spigot is in fluid communication with the filter cartridge so that filtered liquid flows from the filter cartridge into the spigot. It is further contemplated that the spigot can rotate and is mounted to the central housing so that it can rotate up to 360 degrees.

The present invention also contemplates a liquid filter that is mounted to the sink through the hole for the spray nozzle. This simplifies installation because no additional holes are required to be drilled into the counter or sink surface.

The invention further contemplates inclusion of an LED indicator on the filter housing. The LED indicator can be programmed to light upon the occurrence of a specific event or action as determined by preset or user determined parameters. It is contemplated that one of the programmable events for activation of the LED indicator is the termination of a pre-programmed time interval. The time interval would indicate that the filter cartridge was in need of replacing. As readily appreciated by those skilled in the art, the LED indicator can also be set to light at a predetermined number of gallons of liquid filtered.

The present invention is also directed to and contemplates inclusion of a button. The button is in electronic or physical communication with the LED indicator and can have various functions. One such function of the button is as a reset button for the LED indicator.

The present invention is also directed to a sink-mounted water filter. The sink-mounted water filter has a filter housing that rests on top of a sink. Also, a liquid inlet extends downwardly from the filter housing and passes through the sink and into the undercounter space below the counter. The sink-mounted water filter also is equipped with attachment means to affix the water filter to a sink. The water filter also has a switch that can rotate and is affixed to the water filter housing. The switch allows for permitting and terminating liquid flow through the sink-mounted water filter. Also included is a filter cap that is adapted to contain a removable filter cartridge that is disposed within the filter housing. The sink-mounted water filter is designed so that the replaceable filter cartridge can be a standard cartridge available at retail stores that carry filtration products. The sink-mounted water filter also has a spigot mounted to the filter housing and in fluid communication with the removable filter cartridge. Thus, filtered water flows from the replaceable filter cartridge into the spigot.

The present invention is also directed to and contemplates a liquid inlet pipe that extends downwardly from the filter housing and passes through the spray nozzle hole in the sink. It is further contemplated that the liquid inlet can be a threaded pipe. The filter also includes a fastener bolt in the shape of a doughnut having internal threads corresponding to the thread size, shape, and angle of the liquid inlet's threads. Thus, the fastener bolt can be screwed onto the liquid inlet after passing the liquid inlet through the spray nozzle hole in the sink. This will secure the filter to the sink.

DETAILED DESCRIPTION OF THE INVENTION

The filter according to the present invention solves the problems encountered in the prior art related to faucet mounted filters. Specifically, the present invention mounts to the spray attachment opening already present in most sinks. The filter utilizes a replaceable filter cartridge widely available at stores. Another advantage of the present invention is that the filter sits atop the sink or counter at a location that will not interfere with the normal use and operation of the sink. The present invention utilizes the hole in the sink typically used for the spray nozzle attachment. Thus, there is no need to drill extra holes in the sink or counter to accommodate the filter.

Figure 1:
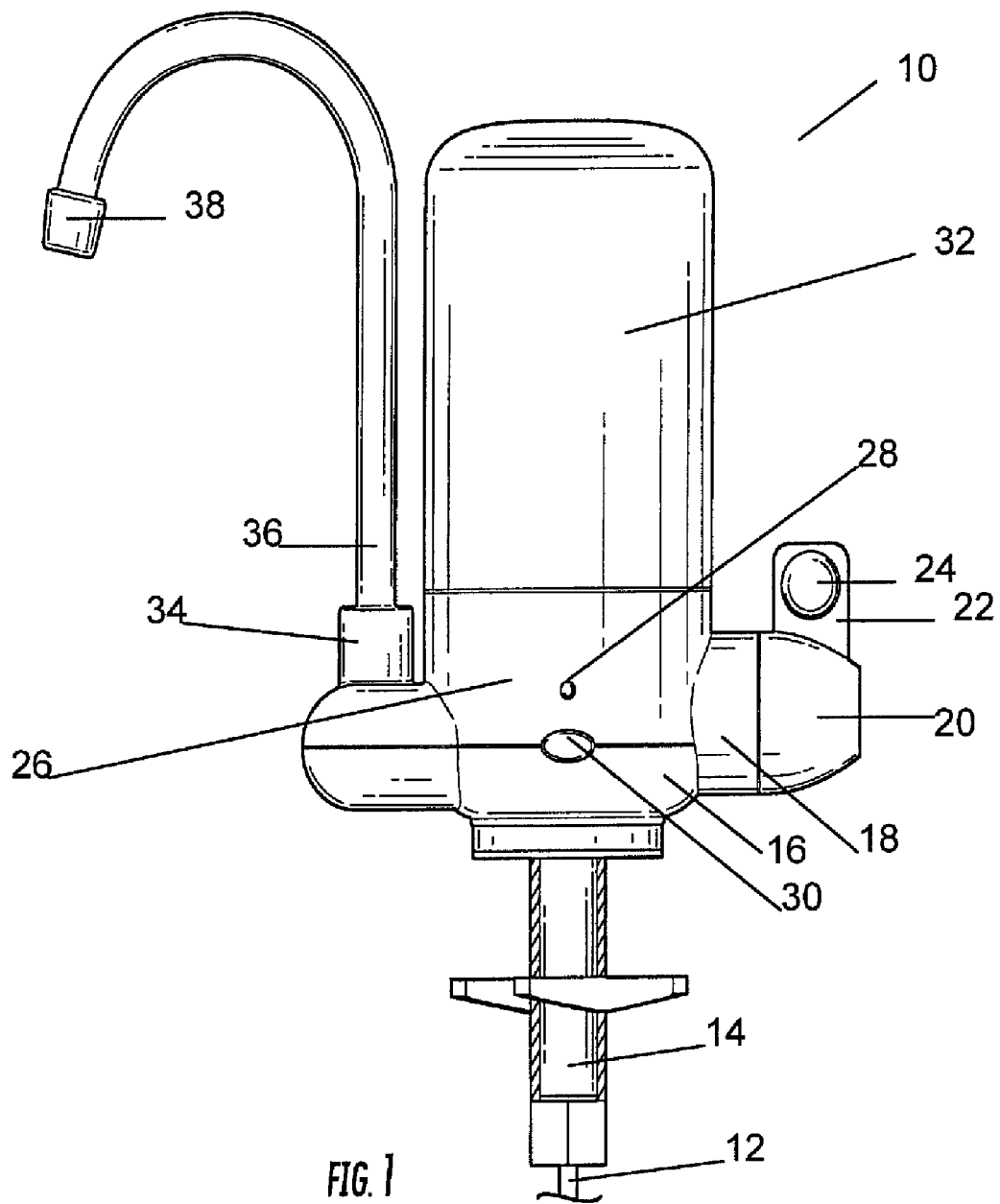
FIG. 1 is a front plan view of the filter according to the present invention.

Referring now to FIG. 1, there is shown a sink-side filter 10 designed to mount to the spray attachment on a typical sink. The filter 10 includes a liquid inlet 12 that is typically a hose or pipe. The liquid inlet 12 is connected to a water source (not shown) to provide fresh water to the filter. The liquid inlet 12 receives fresh water from the source and directs the water into an inlet pipe 14 in fluid connection with the liquid inlet 12. Attachment means in various forms can be used to secure the filter 10 to the sink. As can be appreciated by those skilled in the art, the attachment means can take various forms.

The filter 10 is secured to the sink or countertop via attachment means. In a preferred embodiment, attachment means may be achieved by tightening screws against toggle bolts. In a preferred embodiment, the filter 10 is placed on the sink such that the inlet pipe 14 passes through the hole in the sink intended for the spray nozzle. The screws can be adapted to be flush with the inlet pipe 14 wherein the diameter of inlet pipe 14 and the screws are small enough that all may pass through the hole in the sink without having to drill additional holes for the screws. Otherwise, the screws may pass through holes drilled in the sink adjacent to the predrilled hole for the spray nozzle.

Once the filter 10 is placed onto the sink with the inlet pipe 14 passing through the hole for the spray nozzle, the filter 10 is secured to the sink. The attachment means must secure the filter 10 to the sink with an attachment strong enough to prevent the filter 10 from becoming loose and detaching from the sink. Affixing the filter 10 to the sink via screws and toggle bolts also has the advantage of allowing for easy removal of the filter 10. While the filter 10 is designed to be a permanent fixture on the sink, the ability to remove the filter 10 is advantageous if a homeowner is moving and desires to remove the filter 10 prior to moving.

Directly above and resting on the sink is a bottom housing 16 of the filter. The inlet pipe 14 passes through the bottom housing 16 and into the filter 10 where the water is processed and filtered by passing through a conventional filter cartridge. The bottom housing 16 is designed to stabilize the filter 10 where it attaches to the sink (not shown). The bottom housing can be manufactured from a variety of materials, but in a preferred embodiment is a hard plastic. The hard rubber allows the filter 10 to be securely mounted, but remains flexible enough that the filter can absorb a shock and not crack or break. Thus, if one bumps the filter 10 with a kitchen pot or pan while washing dishes, the filter 10 can press against the bottom housing 16, and the bottom housing 16 will flex and absorb the force.

The bottom housing 16 of the filter 10 rests atop the sink. Integrally attached to the bottom housing 16 is a valve housing 18 that houses an internal valve (not shown). Adjacent to the valve housing 18 is a switch 20. The switch 20 is rotatably mounted to the valve housing 18 in order to rotate between an on position and an off position. The on position allows water to flow through the filter 10 and the off position stops water from flowing into the filter 10 from the inlet pipe 14. In a preferred embodiment the switch 20 is rotatable approximately 90 degrees between the on position and the off position, however, the angle of rotation can be adjusted to any angle desired. Protruding from the switch 20 is a handle 22 that provides an easy grip on the switch 20 for a user to operate. Contained on the handle 22 is a finger groove 24 that provides for a slip-free grip on the handle 22. This is advantageous because often times a user will have soapy or wet hands that will tend to slip. Providing a finger groove 24 on the handle 22 will lessen the likelihood that a user's grip will slip.

Attached to the bottom housing 16 and fitting on top of the bottom housing 16 is a central housing 26. The central housing 26 rests on top of the bottom housing 16 and in a preferred embodiment would snap together with the bottom housing 16 using conventional connecting snaps, tabs, or other means to secure the central housing 26 to the bottom housing 16. The central housing 26 can be integrally attached to the valve housing 18 in an alternate embodiment if the valve housing 18 is not integrally attached to the bottom housing 16. As can be appreciated, however, the bottom housing 16 and central housing 26 can be of unitary construction.

Located approximately in the middle of the central housing 26 of the filter 10 is an LED indicator 28. The LED indicator 28 can be used to indicate multiple, predetermined events by being programmed to light at such an occurrence. In a preferred embodiment, the LED indicator 28 will activate (light) when the filter 10 is in use and providing filtered water. Thus, the LED indicator 28 can be electronically connected to the switch 20 and when the switch 20 is rotated to the on position, the LED indicator 28 will light. Similarly, when the switch 20 is rotated to the off position, the circuit connecting the LED indicator 28 will break causing the LED indicator 28 to turn off.

In an alternate embodiment, the LED indicator 28 can be set to indicate when the filter cartridge (not shown) is in need of replacement. This can be determined by a set time of activity or use, a set volume of water filtered, or any other appropriate quantitative measurement. Conceivably, the LED indicator 28 could have multiple colors or light in varying patterns to alert the user to different events or occurrences. As those skilled in the art can readily appreciate, the LED indicator 28 can serve a multitude of functions and indicate numerous events or actions.

The filter 10 is also equipped with a button 30. The button 30 is located between the bottom housing 16 and the central housing 26, positioned below the LED indicator 28 on the front of the filter 10. The button 30 can serve any number of functions. In a preferred embodiment, the button 30 is a reset button in electronic communication with the LED indicator 28, wherein the LED indicator 28 is set to indicate the time to change the filter cartridge. When pressed, the button 30 will reset the time to zero thereby acting as a triggering event to indicate to the LED indicator 28 that a new filter cartridge has been installed. While the reset function is a preferred embodiment for the button 30, those skilled in the art can easily recognize that the button 30 can be used for other actions or events as well.

Still referring to FIG. 1, the filter 10 is equipped with a filter housing 32 that is removably attached to and rests atop the central housing 26. The filter housing 32 can attach to the central housing 26 in a myriad of conventional ways. In a preferred embodiment, the filter housing 32 would have threads that would complement similar threads on the central housing 26 such that the filter housing 32 could screw onto the central housing 26. As can be appreciated by those skilled in the art, the filter housing 32 could also attach to the central housing 26 via snaps, clips, or other conventional means. Contained within the filter housing 32 is a replaceable filter cartridge (not shown) that is easily removed for exchanging for a fresh cartridge when its filtering capacity has been exhausted. It should be appreciated that the filter housing 32 can be designed in many shapes and sizes to ensure compatibility with a wide range of commercially available filter cartridges.

The central housing 26 has a protrusion on the side opposite from the valve housing 18. The protrusion supports a spigot base 34 that extends upwardly from the protrusion in the central housing 26. The spigot base 34 is affixed to the protrusion and forms part of the central housing 26. A spigot 36 is rotatably mounted in the spigot base 34 such that it may be rotated relative to the front of the filter 10. In a preferred embodiment, the spigot 36 is generally in the shape of an invert "J" and has a spigot cap 38 on the end opposite the spigot base 34. The spigot cap 38 can be removably attached to the spigot 36 such that it can be removed and a hose, nozzle, or other attachment can be attached to the spigot 36.

Figure 2:
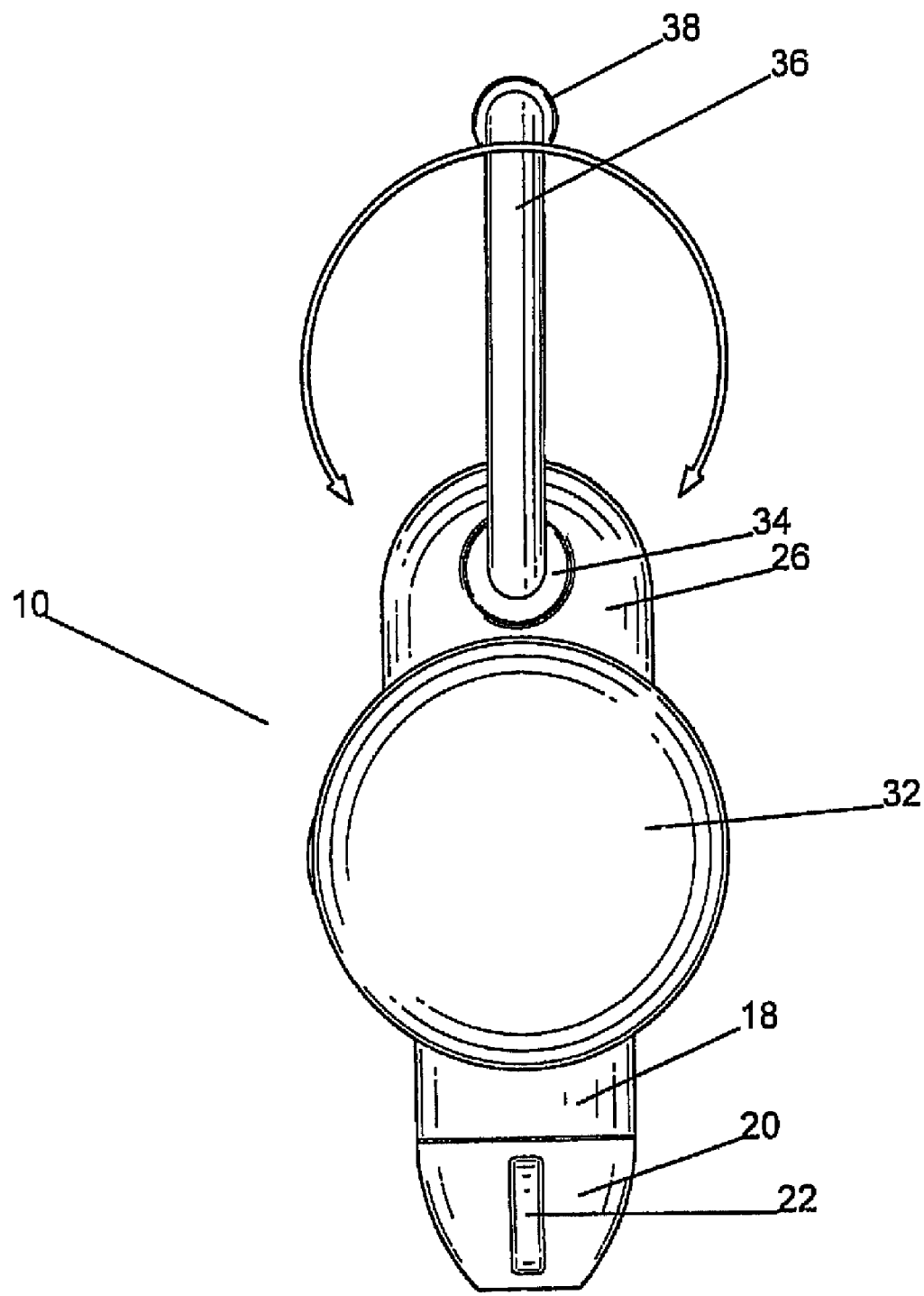
FIG. 2 is a top plan view of the filter according to the present invention.
Figure 3:
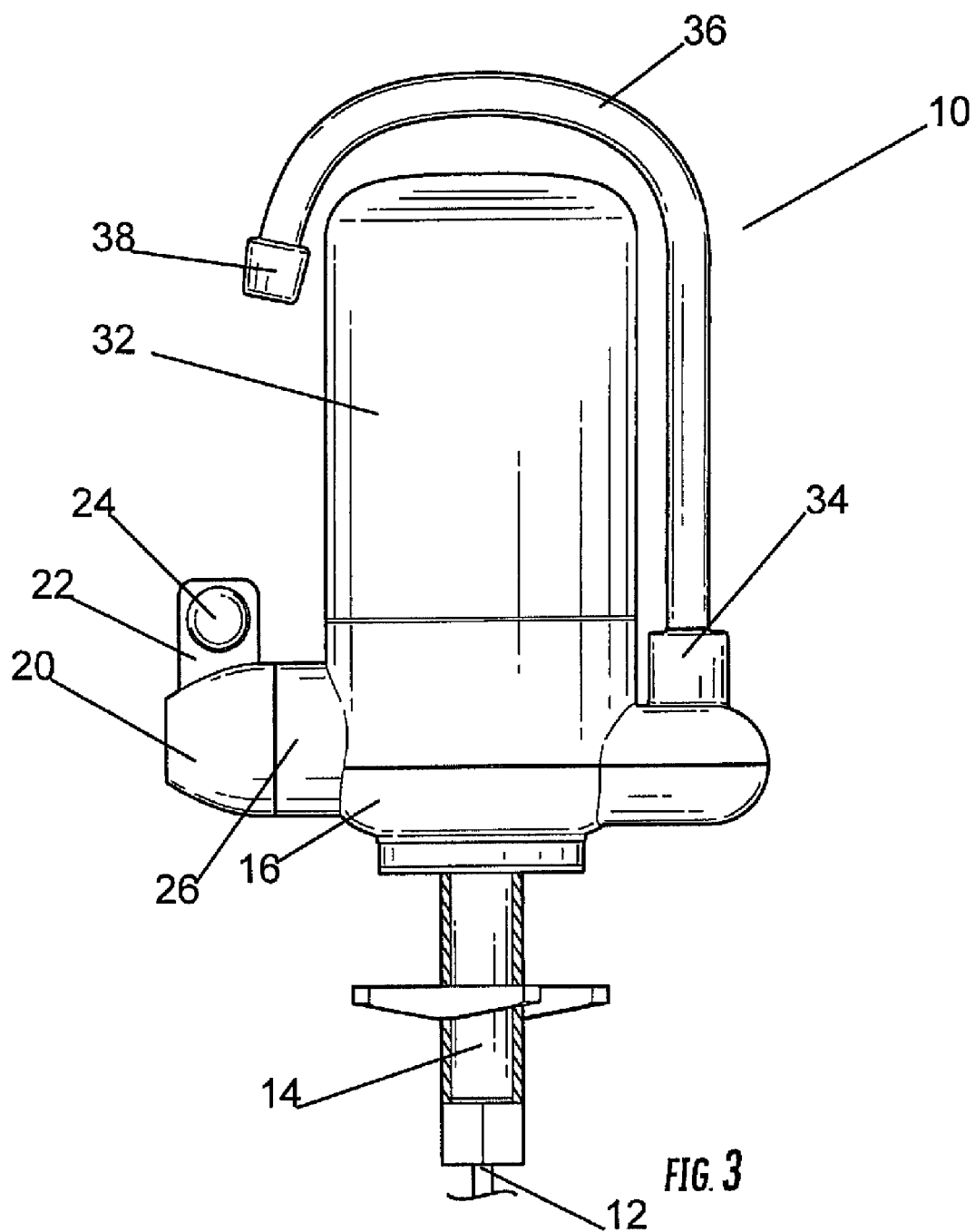
FIG. 3 is a rear plan view of the filter according to the present invention.

Referring now to FIG. 2 and FIG. 3, the feature of a rotatable spigot 36 on the filter 10 according to the present invention is shown. In FIG. 2 the track of movement for the rotatable spigot 36 is illustrated by the arrows indicating opposite directions of circular movement. Regarding FIG. 3, the rotatable spigot 36 is shown in a position overhanging the filter housing 32 as illustrating the potential positions of the spigot 36 relative to the filter 10. The advantage of the rotatable spigot 36 is that when not in use, the spigot 36 can rotate out of the way of the sink, thereby freeing up the room for other pots and pans or activities needing space around or above the sink.

Figure 4:
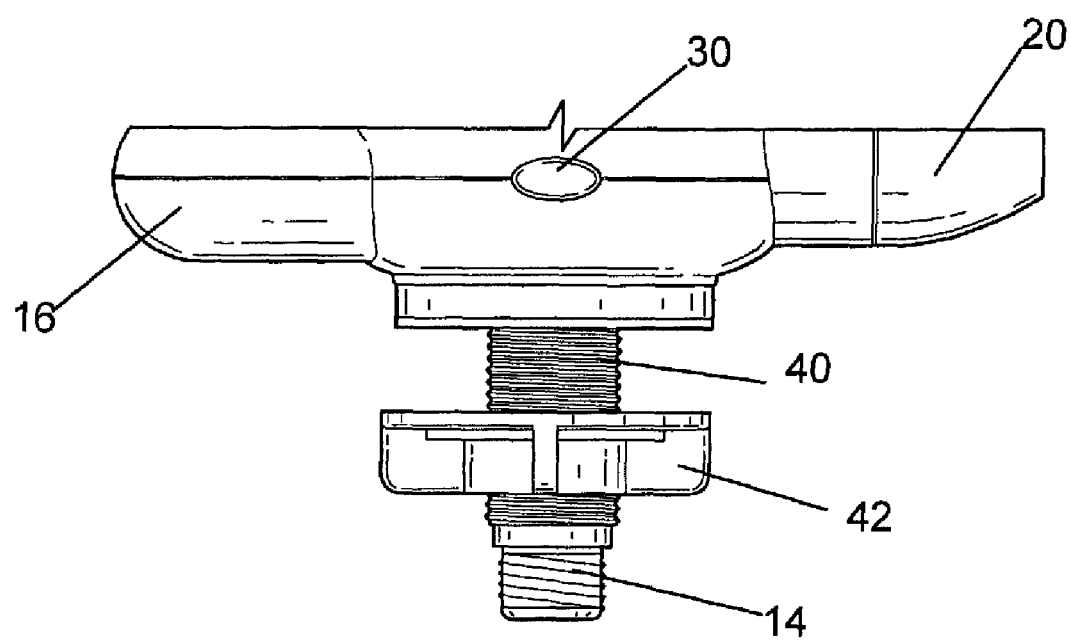
FIG. 4 is a front partial view of an alternative embodiment of the present invention.

Turning now to FIG. 4, an alternative embodiment of the present invention is illustrated. An inlet pipe 14 is provided wherein the exterior of the inlet pipe 14 has threaded grooves 40. A fastener bolt 42 is provided that has a threaded, inner surface that has grooves corresponding to the threaded grooves 40 on the exterior of the inlet pipe 14. Thus, the fastener bolt 42 can be screwed onto the inlet pipe 14 by matching the inner grooves of the fastener bolt 42 to the threaded grooves 40 on the exterior of the inlet pipe 14 and rotating the fastener bolt 42. The filter 10 is placed onto the sink and the inlet pipe 14 passes through the hole in the sink for the spray nozzle such that the inlet pipe 14 fits through the hole into the cabinet under the sink. The fastener bolt 42 is then placed onto the end of the inlet pipe 14 from under the sink and rotated to engage the threaded grooves 40 on the inlet pipe 14 with the threads on the fastener bolt 42. The fastener bolt 42 is continually rotated until it has risen up the inlet pipe 14 and is substantially flush with the underside of the sink. Then, the fastener bolt 42 is tightened such that the pressure maintains the filter 10 in contact with the sink, thereby installing the filter 10 in its proper place. If the homeowner decides at some point to remove the filter 10, the fastener bolt 42 can be unscrewed and the filter 10 removed.

As can be seen from the foregoing description of the present invention, a new sink-side water filter has been invented. Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

We claim:
1. A liquid filter comprising:
    a bottom housing;
    a liquid inlet extending downwardly from said bottom housing;
    attachment means to affix the bottom housing to a sink;
    a central housing affixed to said bottom housing;
    a switch rotatably affixed to said central housing corresponding that is attached to an internal valve for permitting and terminating liquid flow through the a filter;
    a filter housing mounted on said central housing adapted to contain a removable filter cartridge disposed within said filter housing, whereby said liquid inlet directs liquid through said filter cartridge when said valve is open thereby filtering the liquid;
    and a spigot assembly comprising a spigot base extending upwardly from said central housing and mounted to said central housing and a spigot rotatably mounted in said spigot base, such that said spigot assembly is in fluid communication with said filter cartridge such that filtered liquid flows from said filter cartridge to said spigot assembly.

2. The liquid filter of claim 1 wherein the liquid filter is mounted to a sink through the hole for the spray nozzle, said liquid filter containing a removable filter cartridge having a purification material contained within said filter cartridge.

3. The liquid filter of claim 1 further comprising an LED indicator.

4. The liquid filter of claim 3 wherein the LED indicator is programmed to light upon the occurrence of a specific event or action.

5. The liquid filter of claim 4 wherein the event is the termination of a pre-programmed time interval indicating that the filter cartridge needs replacing.

6. The liquid filter of claim 4 wherein the event is a predetermined number of gallons of liquid filtered.

7. The liquid filter of claim 3 further comprising a button in electronic or physical communication with said LED indicator.

8. The liquid filter of claim 7 wherein said button is a reset button for the LED indicator.

9. The liquid filter of claim 1 wherein said spigot is rotatably mounted to said central housing and can rotate up to 360 degrees.

10. A sink-mounted water filter comprising:
    a filter housing;
    a liquid inlet extending downwardly from said filter housing;
    attachment means to affix said filter housing to a sink;
    a switch rotatably affixed to said filter housing for permitting and terminating liquid flow through the filter;
    a filter cap mounted on said filter housing adapted to contain a removable filter cartridge disposed within said filter housing; and
    a spigot assembly comprising a central housing mounted to said filter housing, a spigot base extending upwardly from said central housing and a spigot rotatably mounted in said spigot base, such that said spigot assembly is in fluid communication with said removable filter cartridge.

11. The sink-mounted water filter of claim 10 further comprising a liquid inlet extending downwardly from said filter housing and passing through a spray nozzle hole in a sink, said water filter containing a removable filter cartridge having a purification material contained within said filter cartridge.

12. The sink-mounted water filter of claim 10 wherein said liquid inlet is a threaded pipe and further including a fastener bolt in the shape of a doughnut having internal threads corresponding to the thread size, shape, and angle of said liquid inlet's threads, such that said fastener bolt can be screwed onto said liquid inlet.

13. The sink-mounted filter of claim 12 wherein said fastener bolt is screwed on said liquid inlet after passing said liquid inlet through the spray nozzle hole in said sink thereby securing said filter to the sink.

* * * * *